(12) United States Patent
Chandler

(10) Patent No.: US 12,293,169 B2
(45) Date of Patent: May 6, 2025

(54) SELF-CREATING, SELF-IMPROVING, AND SELF-SIMULATING ARTIFICIAL INTELLIGENCE

(71) Applicant: ARTIFICIALLY INTELLIGENT LLC, Thornton, CO (US)

(72) Inventor: Trevor E. Chandler, Thornton, CO (US)

(73) Assignee: ARTIFICIALLY INTELLIGENT LLC, Thornton, CO (US)

( * ) Notice: Subject to any disclaimer, the term of this patent is extended or adjusted under 35 U.S.C. 154(b) by 164 days.

(21) Appl. No.: 18/045,758

(22) Filed: Oct. 11, 2022

(65) Prior Publication Data

US 2023/0116482 A1     Apr. 13, 2023

Related U.S. Application Data

(60) Provisional application No. 63/254,478, filed on Oct. 11, 2021.

(51) Int. Cl.
*G06F 8/30* (2018.01)
*G06F 8/40* (2018.01)

(52) U.S. Cl.
CPC . *G06F 8/40* (2013.01); *G06F 8/31* (2013.01)

(58) Field of Classification Search
CPC .............. G06F 8/31; G06F 8/40; G06N 20/00
See application file for complete search history.

(56) References Cited

U.S. PATENT DOCUMENTS

| | | | | |
|---|---|---|---|---|
| 2020/0341970 A1* | 10/2020 | Rodrigues | ............ | G06F 16/219 |
| 2022/0108079 A1* | 4/2022 | Roisman | ............... | G06F 40/154 |
| 2023/0027179 A1* | 1/2023 | Patil | ......................... | G06F 8/61 |

OTHER PUBLICATIONS

Yu-Hong Lin "Chatbot Script Design for Programming Language Learning", [Online], pp. 123-125, [Retrieved from Interent on Mar. 17, 2025], <https://ieeexplore.ieee.org/stamp/stamp.jsp?tp=&arnumber=9829460> (Year: 2022).*

* cited by examiner

*Primary Examiner* — Ziaul A Chowdhury
(74) *Attorney, Agent, or Firm* — Dorsey & Whitney LLP

(57) ABSTRACT

An example computer implemented method for generating an artificial intelligence (AI) model from a self-creating script coded in a programming language includes receiving an objective for the AI model and obtaining at least first action code corresponding to a first action, where the first action is associated with an action objective similar to the objective. The method further includes generating at least a second action code based on one of the first action code and a specification of the programming language and comparing a first outcome of the first action code and a second outcome of the second action code. The method further includes inserting one of the first action code and the second action code into the self-creating script based on the comparing the first outcome of the first action code and the second outcome of the second action code and executing the self-creating script including the one of the first action code and the second action code to satisfy the objective.

26 Claims, 6 Drawing Sheets

| (1,5) | (2,5) | (3,5) | (4,5) | (5,5) GOAL |
|---|---|---|---|---|
| (1,4) | (2,4) | (3,4) | (4,4) | (5,4) |
| (1,3) | (2,3) | (3,3) | (4,3) | (5,3) |
| (1,2) | (2,2) | (3,2) | (4,2) | (5,2) |
| (1,1) START | (2,1) | (3,1) | (4,1) | (5,1) |

SELF-CREATING, SELF-IMPROVING, AND SELF-SIMULATING ARTIFICIAL INTELLIGENCE

CROSS-REFERENCE TO RELATED APPLICATIONS

This application is related to and claims the benefit of priority of U.S. Provisional Application No. 63/254,478 filed 11 Oct. 2021 and titled "Self-creating, Self-improving, and Self-simulating Artificial Intelligence," which is hereby incorporated by reference in its entirety for all purposes.

FIELD

The described embodiments relate generally to systems and methods of artificial intelligence and machine learning.

BACKGROUND

Artificial intelligence (AI) and machine learning (ML) are used to solve a wide variety of problems. Current AI models are limited by the data used to train the models and the actions the models are given to execute to solve objectives. Some AI models are trained using training data, where data is analyzed and patterns are identified to train the model. Other AI models are provided with a pre-defined set of actions created for the AI to choose from to determine how to meet an overall objective. Both of these methods bound the models to pre-defined instructions and capabilities, limiting the capabilities of the model to advance beyond its pre-defined starting point.

SUMMARY

An example computer implemented method for generating an artificial intelligence (AI) model from a self-creating script coded in a programming language is disclosed herein. The method includes receiving an objective for the AI model and obtaining at least first action code corresponding to a first action, where the first action is associated with an action objective similar to the objective. The method further includes generating at least a second action code based on one of the first action code and a specification of the programming language and comparing a first outcome of the first action code and a second outcome of the second action code. The method further includes inserting one of the first action code and the second action code into the self-creating script based on the comparing the first outcome of the first action code and the second outcome of the second action code and executing the self-creating script including the one of the first action code and the second action code to satisfy the objective.

Another example computer implemented method for generating an AI model from a self-creating script coded in a programming language is disclosed herein. The method includes receiving an overall objective for the AI model and generating a sub-objective for a first state of the AI model, where the sub-objective is generated based on the overall objective. The method further includes generating a plurality of action code scripts based on a specification of the programming language and assigning rewards to each of the plurality of action code scripts using a reinforcement learning algorithm, where a higher reward is associated with achieving the sub-objective. The method further includes identifying a preferred action code of the plurality of action codes based on the assigned rewards, inserting the preferred action code into the self-creating script, and executing the self-creating script including the preferred action code to satisfy the sub-objective.

Another example computer implemented method for generating an AI model solving a problem is disclosed. The method includes obtaining sub-objectives corresponding to a plurality of states of the problem and generating a plurality of portions of action code corresponding to a plurality of actions, where the portions of action code advance the AI model from a first state of a plurality of states to a second state of the plurality of states. The method further includes testing each of the plurality of action code and identifying, for the first state, a portion of action code of the plurality of portions of action code providing a most efficient transition from the first state of the plurality of states to the second state of the plurality of states. The method further includes identifying, for a remainder of the plurality of states, respective additional portions of action code providing a most efficient transition from a respective state of the plurality of states and combining the identified portions of action code for the first state and the remainder of the plurality of states to generate code providing a solution to the problem.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that:

FIG. 3 illustrates an example objective which may be achieved using an AI model generated by the self-creating AI system, in accordance with embodiments described herein;

DETAILED DESCRIPTION

Figure 1:
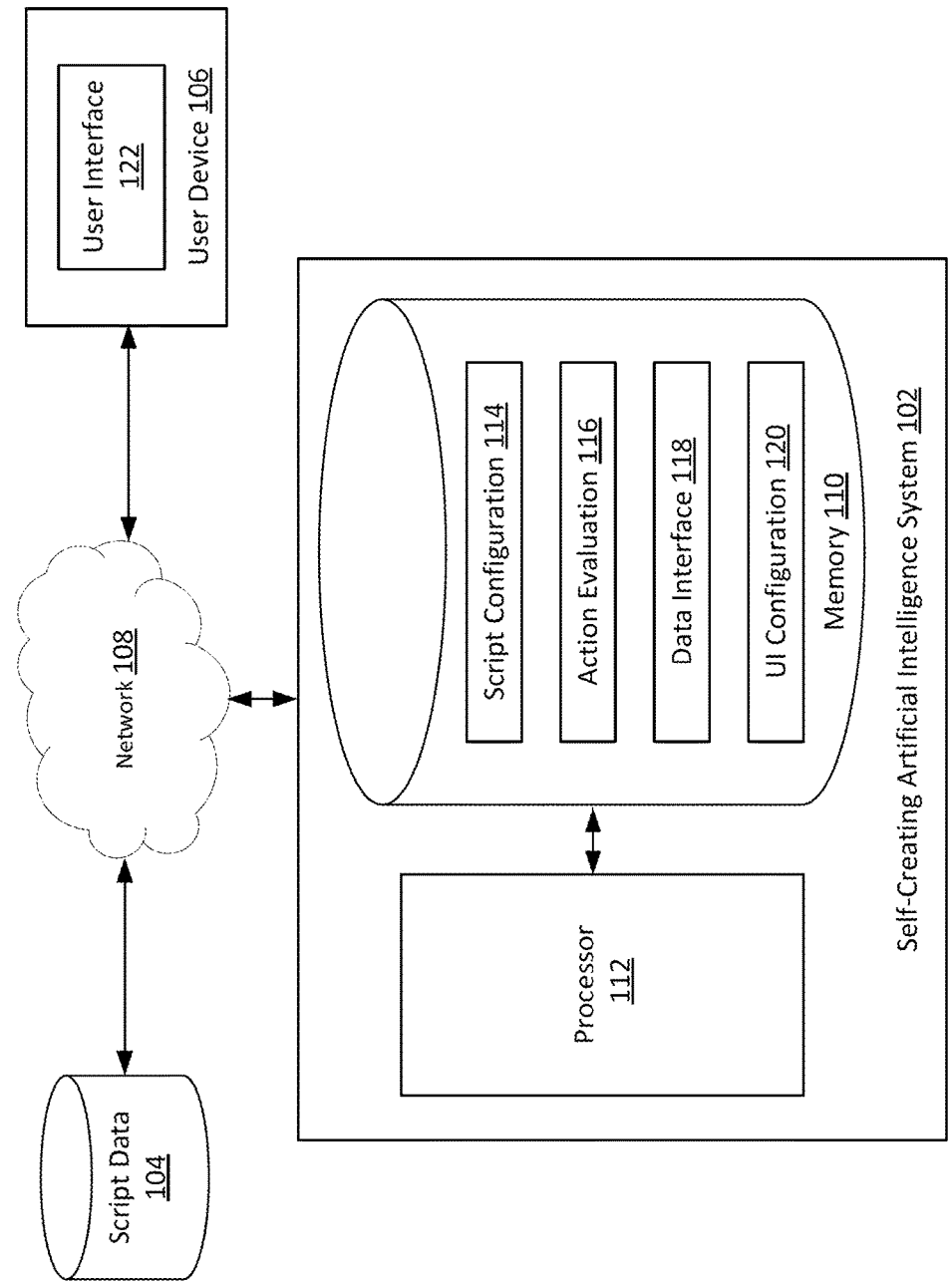
FIG. 1 illustrates an example system including a self-creating artificial intelligence (AI) system, in accordance with embodiments described herein.

The system described herein may provide for emergent AI and/or ML models—models that are able to advance and improve beyond pre-defined starting capabilities. For example, an AI model generated by the system disclosed herein may advance beyond pre-defined starting capabilities by expanding upon its own source code at run time. The system may create objectives for each state of a problem based on a predefined overall objectives, obtain various actions either performed by external systems or built by the system, evaluate whether the actions are effective to solve the objective for the state, and write effective actions into the source code for the emergent AI model. Accordingly, the source code of the system can evolve and the improve beyond its original capabilities and beyond pre-defined actions, as the system is able to create and test new actions not previously used by other models. For example, the system may improve by evolving to solve new problems without additional manual input and/or to produce more efficient solutions to existing problems through automatic generation of new code.

Further, creating objectives for each state allows emergent AI models and other embodiments described herein to identify a variety of ways to achieve their overall objectives. For example, when an AI model is provided with an overall objective, but not with objectives for particular states, the AI model is limited to approaches to completing the overall objective. However, when completing an objective for each state of the problem, a variety of additional potential ways to achieve state objectives can be introduced, leading to new potential ways to achieve an overall objective. For example, actions relating to solving a state objective may not be considered when evaluating how to achieve an overall objective. By moving between states more efficiently, the overall objective may, in turn, be achieved more efficiently. Accordingly, the ability to identify and achieve state objectives, which may be referred to herein as objective emergence, may generate more efficient, accurate, and helpful AI models. The system disclosed herein may utilize action code (e.g., code used by other machine learning models to achieve objectives or sub-objectives) to solve similar or new problems than those to which the code was originally written. For example, action code used to solve a 2 dimensional maze may be applied to solving a 3 dimensional maze. The system may also combine previously used action code to solve new problems, leading to more efficient training and problem solving. For example, by combining different pieces of action code (e.g., code corresponding to two separate actions) that are used to solve a 2 dimensional maze, the system may generate new action code that efficiently solves a 3 dimensional maze. Accordingly, solutions may build upon previously trained models, instead of each model being trained from scratch and being treated as a new problem to solve.

The system disclosed herein may further automatically build new action code to achieve an objective, which may further expand the abilities of AI models generated by the system to achieve objectives more efficiently. For example, without the ability to automatically build new action code, AI models may rely on actions already performed by similar AI models, which may not be the most efficient way to achieve an objective. Alternatively or additionally, new action code may be manually coded, which may require substantial time and/or resources, limiting the amount of new actions which are coded. Further, where new action code is human generated, new actions are limited to those conceived of by the humans coding the new actions. Such action code may preclude the most efficient solutions to achieving an objective due to the limitations of human coded actions.

In various examples, the system disclosed herein may utilize a programming language specification, such as the python grammar, along with functionality checks, such as assertions, to ensure that action code is functional before placing the action code within a script. Accordingly, the system may generate near infinite amounts of syntactically correct action code for use in generating AI models. The system disclosed herein may also, in various examples, generate new action code based on previously generated action code used by other AI models to achieve similar objectives.

As one example, relevant portions of "action code" (e.g., code that advances an AI algorithm from one state to the next, such as moving between nodes in a graph data structure, advancing an algorithm along a path, and the like), may be applied in different scenarios or objectives to determine if the actions are helpful to those scenarios or objectives. In some instances, the action code may even be modified into different sequences or otherwise combined with other action code portions to generate new actions for the objective.

In various examples, the system may test action code in various scenarios, ultimately identifying action code that advances an AI algorithm most efficiently from one state to the next, where the advancement moves the AI algorithm closer to an end-state where an overall objective of the algorithm is achieved. Such action code may be generated by the system either by combining and/or modifying action code used to solve other problems and/or by generating new action code using a programming language specification (e.g., combining short, syntactically correct code fragments into larger blocks of action code). To identify the action code that most efficiently advances the AI algorithm to a new state, the system may utilize a reinforcement learning algorithm, where higher rewards (e.g., weights) are provided to action code which is more efficient. The process may be repeated for each state of a problem, and the efficient action code identified for each state may be combined to generate code for an AI model achieving an overall objective (e.g., solving an initial problem).

Various embodiments of the present disclosure enable generation of new software or code that corresponds to new actions that were not originally predicted in advance. This enables more efficient solutions for problems as a user does not need to define the solution that an AI model is going to need to generate and then provide data to the AI model to train for that solution. Instead, the solution is unknown and the code that is generated solves the problem based on trying, modifying, and combining code from other solutions or objectives, often in a way that a human programmer may not have envisioned would lead towards a solution of the objective.

The systems and methods described herein may obtain action code from pre-existing scripts, and new actions may be generated from action code obtained from the pre-existing scripts. New actions may further be generated by the system by building up code fragments into new action code. In some examples, action code corresponding to every action identified as a most efficient action to transition from one state to another and any new action code generated by the system may persist at a database, which may be generated at runtime. Accordingly, the system may learn over time and increase its efficiency as the system is able to evaluate and identify more actions from the database. Current AI models are generally narrow, meaning that a script is useful for solving one task and is generally not applicable or useful for solving other types of tasks. By utilizing a database of actions along with objectives or sub-objectives accomplished by the actions, the system may reference what it has already learned, providing the ability for the system to benefit from its previous actions. When manually coding, such actions may not be considered, limiting efficiency of AI models. By allowing the system to learn from its own actions, the system may eventually progress to a state of general AI, meaning the system may solve nearly any problem or objective using actions the system has previously used (e.g., those stored in the database) without manual interventions for solving each new problem.

Various features of the disclosed system and methods may be implemented on one or more computing devices, such as servers, personal computers, mobile devices, or the like. One or more methods or steps may be executed by a processor, processing element, or multiple processors executing instructions that may be provided as software or the like. While various examples herein may be discussed with respect to a particular implementation, such as python scripts, similar techniques may be implemented in other examples, such as using script in other programming languages based, for example on the desired structure and use cases for the system. Further, various examples are discussed with respect to scripts, which may be implemented as algorithms and stored at a storage medium, such as memory, as software instructions. As such, the examples provided are illustrative. Additionally, as used herein, the terms AI and ML are meant to encompass both types of models, i.e., are not necessarily exclusive to one or the other.

Turning now to the figures, FIG. 1 illustrates an example system 100 including a self-creating AI system 102. The self-creating AI system 102 may generally be used to generate AI models or algorithms using self-creating scripts. The self-creating AI system 102 may communicate with user devices, such as user device 106 and data stores, such as script data 104 via a network 108. For example, user device 106 may connect to the self-creating AI system 102 using a mobile application, web page, desktop application or other methods. Through the connection, the user device 106 may, for example, provide objectives or other input to create an AI model using the self-creating AI system 102. In some examples, all or portions of the self-creating AI system 102 may be local to the user device 106 instead of being accessed via the network 108. In various examples, all or portions of the self-creating AI system 102 may be hosted in a cloud computing environment and/or may reside on one or more servers (e.g., web serves) accessible by the user device 106 and other user devices accessing the self-creating AI system 102.

Generally, the user device 106 may be a device belonging to an end user accessing the self-creating AI system 102. Such user devices 106 may be used, for example, to request generation of new AI models, to provide objectives for creation of new AI models, evaluate and view results generated by AI models created using the self-creating AI system 102, and the like. In various embodiments, additional user devices may be provided with access to the self-creating AI system 102. Where multiple user devices access the self-creating AI system 102, the user devices may be provided with varying permissions, settings, and the like, and may be authenticated by an authentication service prior to accessing the self-creating AI system 102. In various implementations, the user device 106 and/or additional user device may be implemented using any number of computing devices included, but not limited to, a desktop computer, a laptop, tablet, mobile phone, smart phone, wearable device (e.g., AR/VR headset, smart watch, smart glasses, or the like), smart speaker, or other device accessing the internet.

Generally, the user device 106 may include one or more processors, such a central processing unit (CPU) and/or graphics processing unit (GPU). The user device 106 may generally perform operations by executing executable instructions (e.g., software) using the processors.

In some examples, the user interface 122 at the user device 106 may be used to provide information (e.g., objectives, requests for new AI models, and the like) to, and display information (e.g., outputs from AI models, and the like) from the self-creating AI system 102. The user interface 122 may also access various components of the self-creating AI system 102 locally at the user device 106 through webpages, one or more applications at the user device 106, or using other methods. The user interface 122 may also be used to display output from AI models generated using the self-creating AI system 102, and the like, at the user device 106.

The network 108 may be implemented using one or more of various systems and protocols for communications between computing devices. In various embodiments, the network 108 or various portions of the network 108 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like. Various components of the system 100 may communicate using different network protocols based on location. For example, components of the self-creating AI system 102 may be hosted within a cloud computing environment and may communicate with each other using communication and/or network protocols used by the cloud computing environment. In various examples, the self-creating AI system 102 may be downloaded to the user device 106, such that the self-creating AI system 102 may be utilized at the user device 106 while the user device 106 is offline. For example, the self-creating AI system 102 may function as an application downloaded to the user device 106.

The system 100 may include one or more datastores, such as script data 104 storing various information and/or data including, for example, self-creating scripts, preexisting scripts, management scripts, objectives, action code, assertions, and the like. Preexisting scripts may be any types of scripts created at the outset of the self-creating AI system 102 (e.g., before creation of AI models using the self-creating AI system 102) and may include machine learning scripts or AI scripts including actions lists. In various examples, the preexisting scripts may include some action code (e.g., code that may be written into another script to perform an action) within an actions section that may be tagged at the beginning and/or end of the preexisting script. In various examples, when an AI model is generated by the self-creating AI system 102, its code may also be stored as a preexisting script. Generally, preexisting scripts and/or action code within preexisting scripts may be associated (e.g., tagged with) objectives and/or sub-objectives achieved using the preexisting script. Accordingly, the self-creating AI system 102 may utilize action code from preexisting scripts to generate new AI models to achieve the same or similar objectives.

Self-creating scripts may begin as code templates and evolve into scripts for AI models generated by the self-creating AI system 102. For example, self-creating scripts stored as script data 104 may include headers and tagged action sections. However, the code templates may have an empty action section, that is, a portion of the script may be tagged as an actions section but may not have any code written in the actions section. The self-creating scripts may be expanded by the self-creating AI system using the systems and methods described herein to add code to the actions section, creating an AI model.

Action code may include, in various examples, code which, when executed, performs some action in furtherance of an objective. Action code may include syntactical code for function calls and variables which can be used as markers to identify portions of a larger code base that correspond to actions. Generally, action code advances an algorithm from a first state to a second state, where the second state brings the algorithm closer to solving a problem (e.g., achieving the objective). For example, where the objective is moving through and solving a two-dimensional maze, example action code may move left, right, up, or down to a new state. Other objectives may include, for example, navigating to a particular location in the most efficient manner or performing an efficient search of a data structure. In various examples, objectives may be associated with action code when stored as script data 104. For example, an objective may include, in a two-dimensional maze, moving from a state associated with a (0,0) position in the maze to a state associated with a (1,1) position in the maze. Such an objective may be stored as associated with one or more actions (e.g., action code) which have been used by other machine learning or AI models to achieve the objective.

In various examples, script data 104 may include a table storing additional information used to access the action code for insertion in a code template of the self-creating script. For example, a table stored at script data 104 may include header information used to access action code within pre-existing scripts. An example table may store objectives, template types, and header information. Accordingly, the self-creating AI system 102 may traverse the table to locate similar objectives and use the associated header information to locate the associated preexisting scripts and the relevant action code within the associated preexisting scripts. The table may be expanded by the self-creating AI system 102 by adding entries for code generated by the self-creating AI system 102 when generating AI models.

In various examples, script data 104 may further include programming language specifications and assertions used to test code and/or scripts generated by the self-creating AI system 102 using the programming language specifications. For example, in some implementations, the self-creating AI system 102 may generate action code using a specification of a programming language of the self-creating script. Such a specification of a programming language may include available strings and/or syntax available to program in the language. The python grammar is one example of such a programming language specification, though other programming language specifications may be used, in various examples. Assertions used to test new action code may include, in various examples, both basic assertions (e.g., the ability of the action code to create a file, return a certain number, assign a value to a variable, allocate memory to a variable, and the like) and advanced assertions (e.g., the ability to add multiple numbers, return a solution to a function, read a file, iterate through a file, append text, and the like). Such assertions may, in various examples, be manually programmed assertions or assertions configured by the self-creating AI system 102.

While script data 104 is shown as being stored at a datastore accessible by the self-creating artificial intelligence system 102 via a network 108, in various examples, some or all of the information described as script data 104 may be stored locally (e.g., at memory 110) to the self-creating artificial intelligence system 102. For example, code templates for self-creating scripts, assertions, and action code may be stored at memory 110 while other script data 104, such as programming language specifications, may be stored remote from the self-creating AI system 102 (e.g., at a datastore accessible by the self-creating AI system 102 via the network 108).

In various implementations, the self-creating AI system 102 may include or utilize one or more hosts or combinations of compute resources, which may be located, for example, at one or more servers, cloud computing platforms, computing clusters, and the like. Generally, the self-creating AI system 102 is implemented by a computing environment which includes compute resources including hardware for memory 110 and one or more processors 112. For example, the self-creating AI system 102 may utilize or include one or more processors, such as a CPU, GPU, and/or programmable or configurable logic. In some embodiments, various components of the self-creating AI system 102 may be distributed across various computing resources, such that the components of the self-creating AI system 102 may be implemented as a serverless service, where computing resources for various components of the self-creating AI system 102 may be located across various computing environments (e.g., cloud platforms) and may be reallocated dynamically and automatically according to resource usage of the self-creating AI system 102. In various implementations, the self-creating AI system 102 may be implemented using organizational processing constructs such as functions implemented by worker elements allocated with compute resources, containers, virtual machines, and the like. In various examples, the self-creating AI system 102 may be downloaded as an application to the user device 106. In these examples, the self-creating AI system 102 and/or script data 104 may be local to the user device 106.

The memory 110 may include instructions for various functions of the self-creating AI system 102, which, when executed by the processor 112, perform various functions of the self-creating AI system 102. For example, the memory 110 may include instructions for implementing script configuration 114, action evaluation 116, a data interface 118, and/or UI configuration 120. In various examples, memory 110 may further include data utilized and/or created by the self-creating AI system 102, such as script templates, self-generating scripts, AI models generated using the self-creating AI system 102, user preferences, and the like. Similar to the processor 112, memory resources utilized by the self-creating AI system 102 may be distributed across various physical computing devices.

In various examples, when executed by the processors 112, instructions for script configuration 114 may interact with self-creating scripts, script templates, action code, code fragments, and the like to create an AI model using the self-creating AI system 102. For example, script configuration 114 may generate sub-objectives based on an overall objective for an AI model. Script configuration 114 may further obtain action code (e.g., from script data 104) to place into a script template for a self-creating script, generate additional action code to test in the self-creating script, clone the self-creating script to test code in the self-creating script, add vetted action code into the self-creating script, and the like. In some examples, script configuration 114 may further obtain such action code based on the overall objective and/or the generated sub-objectives.

Instructions for action evaluation 116 may, in various examples, when executed by the processors 112, evaluate various action codes to determine which action code most efficiently achieves or satisfies a given objective, such as an overall objective or a sub-objective for a particular state. In some examples, such action evaluation 116 may be performed using reinforcement learning techniques, where more effective code is generally rewarded higher by the reinforcement learning algorithms (e.g., weighted more heavily).

In various examples, when executed by the processors 112, instructions for the data interface 118 may interact with various components of the self-creating AI system 102 and/or external datastores to access and/or store data for the self-creating AI system 102. For example, data interface 118 may access script data 104 responsive to requests from script configuration 114. Data interface 118 may further access various data from third party datastores, websites, or other data sources accessible by the self-creating AI system 102, such as websites or documentation storing programming language specifications. Data interface 118 may include or access information regarding how to access such data sources, such as universal resource locators (URLs), schemas for various databases, pre-created queries, and the like.

Instructions for UI configuration 120 may, in various examples, configure and present user interfaces to user devices accessing the self-creating AI system 102 (e.g., at user interface 122 of the user device 106). UI configuration 120 may further receive information via user interfaces 122 at user devices 106 and communicate such information to other components of the self-creating AI system 102. For example, a UI configuration 120 may present a user interface at the user device 106 configured to collect input, including an overall objective for an AI model, from a user of the user device 106. UI configuration may then receive the overall objective for the AI model and provide the overall objective to script configuration 114 and/or action evaluation 116 to generate a new AI model satisfying the overall objective using the self-creating AI system 102. UI configuration 120 may further provide, via a user interface 122 at a user device 106, information about AI models generated by the self-creating AI system 102, such as outputs produced by the AI models, details about execution of the AI models, and the like.

Figure 2:
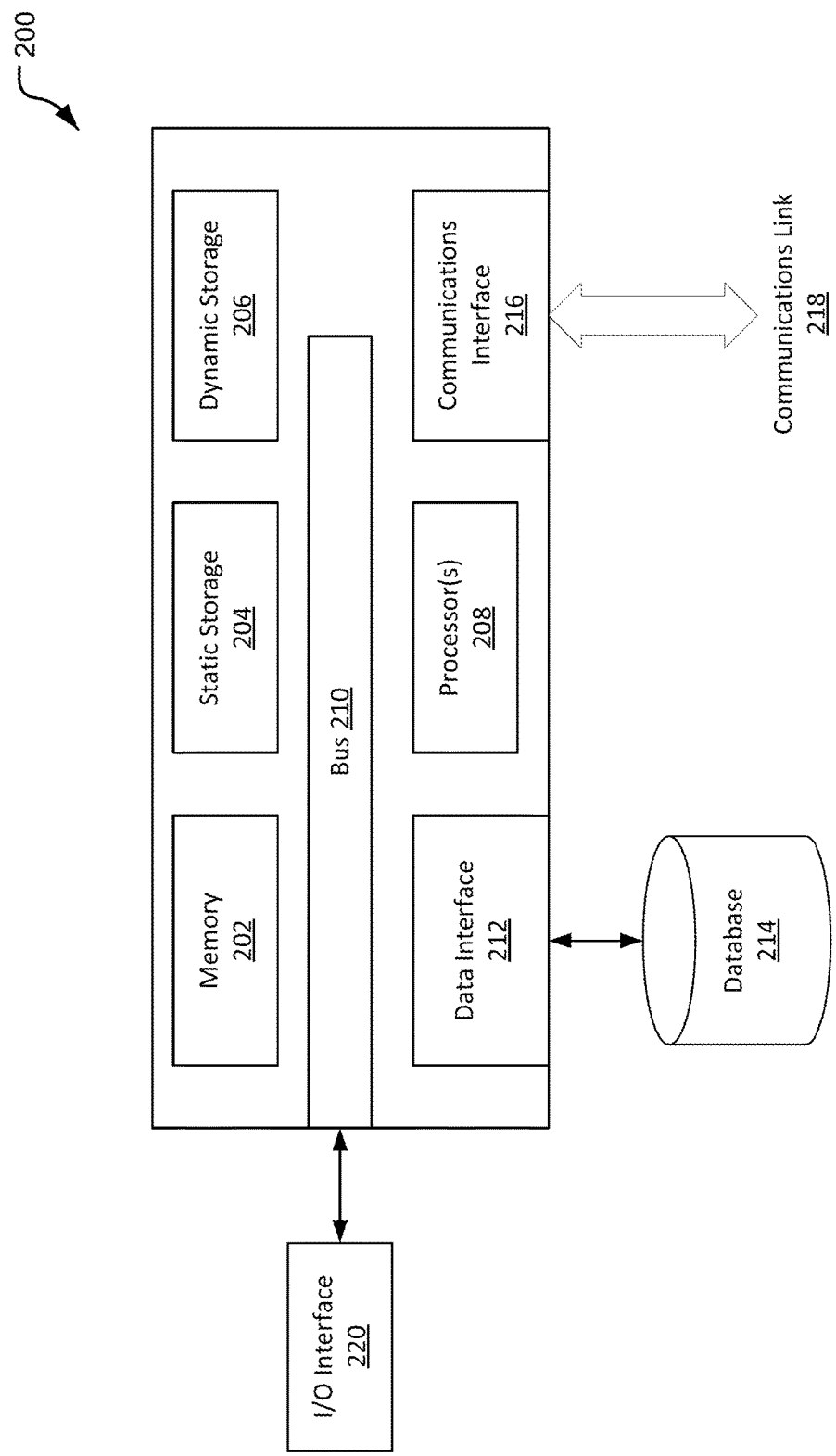
FIG. 2 is a schematic diagram of an example computer system which may be used to implement various embodiments in the examples described herein.

Turning to FIG. 2, an example computing system 200 may be used for implementing various embodiments in the examples described herein. For example, processor 112 and memory 110 may be located at one or several computing systems 200. In various embodiments, user device 106 is also implemented by a computing system 200. This disclosure contemplates any suitable number of computing systems 200. For example, the a computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. The processor 208 circuity includes circuitry for performing various processing functions, such as executing specific software for perform specific calculations or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. For example, instructions for UI generation 116, content processing 118, and standard identification 120 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In one embodiment, the term "logic" shall mean any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. For example, script data 104 may be stored using a database 214.

FIG. 3 illustrates an example objective which may be achieved using an AI model generated by the self-creating AI system 102. While FIG. 3 shows a particular problem which may be solved utilizing the self-creating AI system 102, code and/or AI models generated by the self-creating AI system may solve a variety of additional problems, such as autonomous navigation, searching, automated interactions (e.g., chatbots), automated game play, and the like. For example, an AI model generated by the self-creating AI system 102 may be configured to solve a maze or find a most efficient path from a starting point to an ending point. The environment 300 shown in FIG. 3 is a 5×5 two-dimensional environment including states at each position of the two-dimensional environment. Generally, an overall objective may, for example, be to find the most efficient path between a starting location (e.g., location (1,1) in the environment 300) and a goal or ending location (e.g., location (5,5)). Each location in the environment 300 may correspond to a state for which the AI model, using the self-creating AI system 102 finds the most efficient action to progress towards the goal location.

In this example, the self-creating AI system 102 may utilize existing actions as well as generating new actions either from combinations of existing actions or using a programming language specification. Such generated actions may move the AI model between states of the environment 300. For example, the existing actions may allow the AI model to move left, right, up, and down between states of the environment 300. The self-creating AI system 102 may generate new actions allowing the AI model to transition between states using diagonal motions, which may result in a more efficient path between the starting state (1,1) and the goal state (5,5).

Though the AI models, objectives, and actions described herein are generally described in the context of maze solving or path determining objectives, the self-creating AI system 102 may be utilized to generate AI models satisfying a variety of overall objectives.

Figure 4:
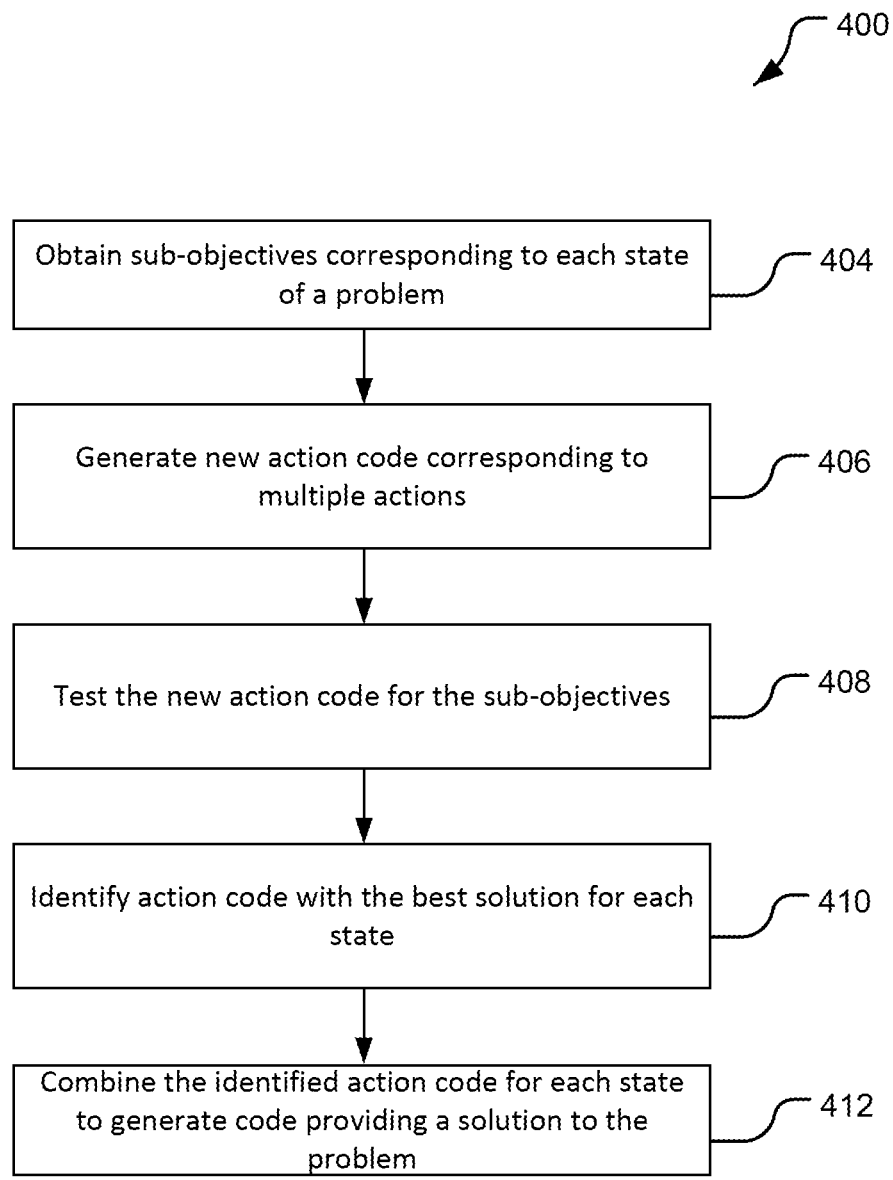
FIG. 4 illustrates an example method of generating an AI model using the self-creating AI system, in accordance with embodiments described herein.

FIG. 4 illustrates an example method 400 of generating an AI model using the self-creating AI system 102. At block 402, the self-creating AI system 102 obtains sub-objectives corresponding to each state of a problem. In some examples, the self-creating AI system 102 may generate sub-objectives from an overall objective provided by a user or determined based on a problem statement. For example, for a problem statement for navigating to a particular point, the self-creating AI system 102 may determine that reaching the end point from a starting point is the overall objective. In this example, sub-objectives may be to move from a first state to the adjacent state (e.g., a node connected to a node symbolizing the first state in a graph data structure) closest to an end state associated with the overall objective.

The self-creating AI system 102 generates, at block 406, new action code corresponding to multiple actions. New action code may be generated in several ways. In some examples the self-creating AI system 102 may use one or any combination of ways to generate new action code to solve a single problem. Action code may, for example, be generated by combining or modifying existing action code used to solve other problems. For example, script configuration 114 may access script data 104 to locate action code for actions associated with objectives similar or the same as the sub-objective. In some examples, script configuration 114 may combine two or more portions of action code to generate new action code.

The self-creating AI system 102 may further generate action code using a programming language specification, such as the python grammar specification, to build new code using syntactically correct code fragments found in the specification. In various examples, the self-creating AI system 102 may test such code fragments for functionality (e.g., ensure that the code fragments compile and run without errors) before combining the code fragments into larger blocks of code. Such larger blocks of code (e.g., events and/or procedures) may be tested for functionality using assertions inserted into the code blocks at runtime. In various examples, the self-creating AI system 102 may construct any number of intermediate blocks of code before obtaining a portion of code to be tested as action code. Methods of generating action code using a programming language specification are further described herein with reference to the method 600 of FIG. 6.

At block 408, the self-creating AI system 102 tests the new action code for the sub-objectives. Action evaluation 116 may test the new action code by executing each portion of action code and determining which action code is most efficient in moving the AI algorithm from a first state to a second state. To test each portion of action code, action evaluation 116 may clone the code template of the self-creating script a number of times equal to the number of portions of action code to be tested, insert a portion of action code into each clone of the code template, and execute and compile each cloned code template.

The self-creating AI system 102 identifies action code with the best solution for each state at block 410. The results of execution of each code template may be evaluated, in various examples, using reinforcement learning techniques which give higher rewards to more efficient results or outcomes. For example, a reward may be a function resulting in a higher value for moving to a state which is closer to the overall objective (e.g., final state). Action code having the best solution may be action code with the highest numerical outcome of the reward function. The identified action code may be written into the code template for the AI model, and the self-creating AI system 102 may move onto identifying action code for the next state of the problem.

At block 412, the self-creating AI system 102 combines the identified action code for each state to generate code providing a solution to the problem. Once the best action code is identified for a particular state, the self-creating AI system 102 may repeat the method, generating new action code and identifying preferred action code for the next state of the algorithm. In some examples, the self-creating AI system 102 may retain previously generated action code and test the action code at the next state, either in addition to or as an alternative to generating new action code for each state. As new action code is identified for each state, the code template is updated to include the new action code. Once the code reaches the end state of the problem (e.g., achieves the overall objective), the code template may be complete and include action code which moves the algorithm from a starting state to the end state, ultimately solving the problem.

Figure 5:
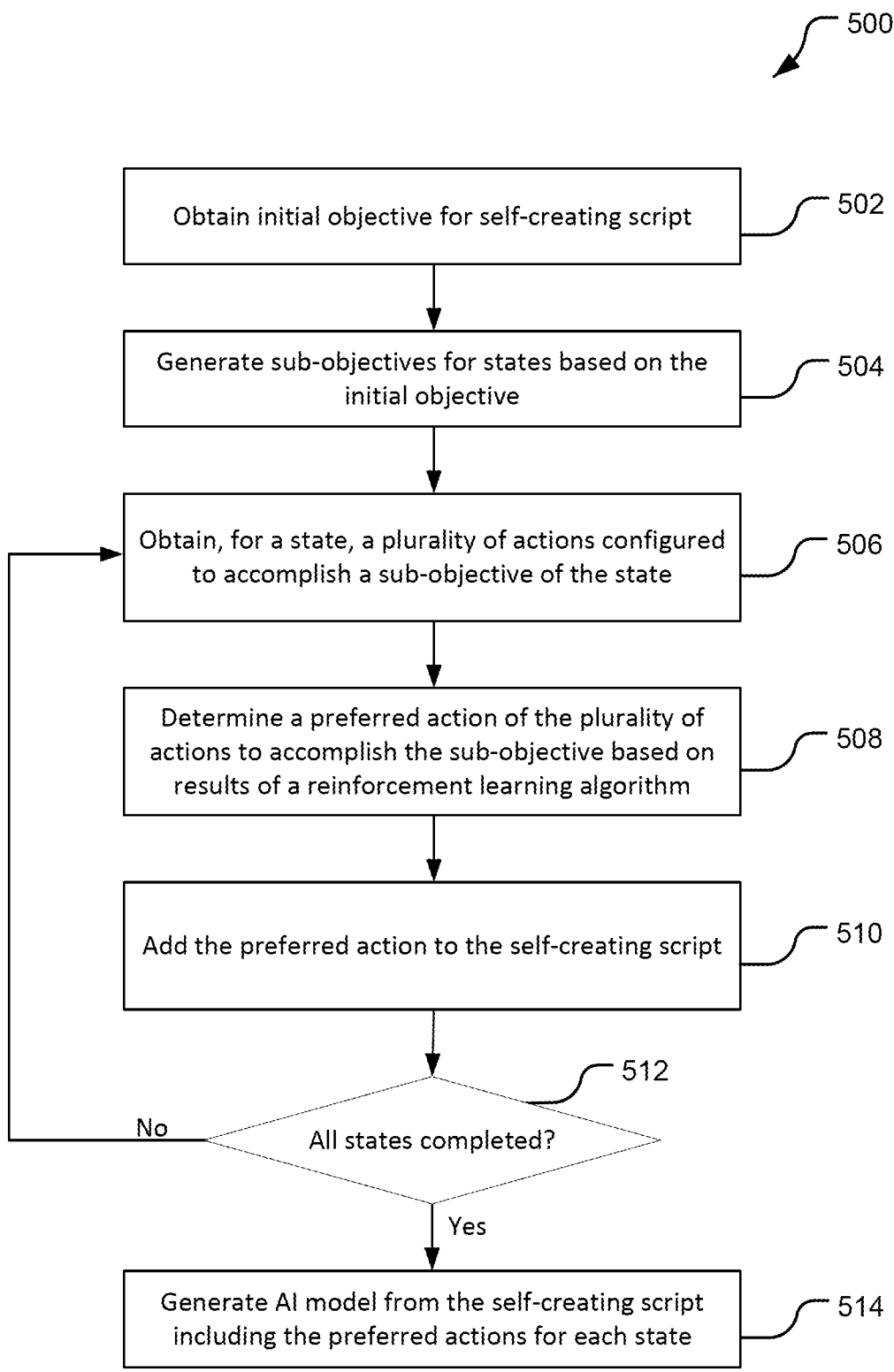
FIG. 5 illustrates an example method of generating an AI model using the self-creating AI system, in accordance with embodiments described herein.

FIG. 5 illustrates an example method 500 of generating an AI model using the self-creating AI system 102. At block 502, the self-creating AI system 102 obtains an initial objective for a self-creating script. In various examples, the initial objective may be obtained from a user via a user interface (e.g., the user interface 122 of the user device 106).

For example, UI configuration 120 may present a user interface at the user device 106 to collect configuration information to generate an AI model using the self-creating AI system 102. Such configuration information may include an initial objective, which may be an overall objective for the AI model to solve. For example, with reference to FIG. 3, the overall objective may be to traverse an efficient path between the starting state (1,1) and the goal state (5,5).

The self-creating AI system 102 generates, at block 504, sub-objectives for states based on the initial objective. A sub-objective may move the AI model between states of the environment. For example, with reference again to FIG. 3, a first sub-objective may be to move between the starting state (1,1) to a next state adjacent to the starting state (1,1), where the next state is the state adjacent to the starting state (1,1) closest to the goal state (5,5). At block 504, script configuration 114 may receive the overall objective and may identify the sub-objective.

At block 506, the self-creating AI system 102 obtains, for a state, a plurality of actions configured to accomplish a sub-objective of the state. For example, script configuration 114 may access script data 104 to locate action code for actions associated with objectives similar to the sub-objective. In some examples, where script data 104 includes a table, script configuration 114 and/or data interface 118 may locate, in the table, objectives similar to the sub-objective generated at block 104. Similar objectives may be located, for example, using a similarity score relating the objectives in the table to the sub-objective. The headers corresponding to the objectives in the table may then be used to locate the preexisting scripts including the action code associated with the objectives, as well as to locate the action code within the preexisting scripts. For example, the preexisting scripts may include headers around various action code, and such headers may be stored in the table at script data 104. Once the action code is located, script configuration 114 may extract the relevant action code from the preexisting scripts.

In some examples, the self-creating AI system 102 may further generate additional action code. For example, script configuration 114 may utilize the method 600 described with respect to FIG. 6 herein to generate additional action code using a programming language specification, such as the python grammar. For example, script configuration 114 may identify code fragments within the python grammar, combine the code fragments to create blocks of code (e.g., events and/or procedures), and test the generated code for functionality before saving the generated code as action code. Script configuration 114 may further generate additional actions by combining and/or altering existing action code obtained from script data 104. For example, where script configuration 114 obtains action code for moving right between states and action code for moving down between states, the action code may be combined to create action code for moving diagonally between states.

The self-creating AI system 102 determines a preferred action of the plurality of actions to accomplish the sub-objective based on results of a reinforcement learning algorithm at block 508. Action evaluation 116 may generally determine the preferred action from the actions retrieved from the preexisting scripts as well as the actions generated by the self-creating AI system 102. To begin the evaluation process, script configuration 114 may clone the self-creating script (e.g., the code template of the self-creating script) for each of the actions obtained at block 506. Script configuration 114 may then insert the action code associated with the actions into the cloned scripts. In various examples, script configuration 114 may insert the action code into the code template of the self-creating script using headers in the code template indicating the location, within the script, for the action code.

Script configuration 114 may, when inserting action code into the code template, parse the source code in a way which creates executable code within the cloned script template. For example, action code may include syntactical code for function calls and variables and these can be used as markers to identify portions of a larger code base that correspond to actions. Script configuration 114 may find locations of the beginning and end of an action code, as well as specific behaviors existing in the action by searching the source code for specific features. For example, source code text is generally considered part of a method where it contains text followed by an open parenthesis, ending with a matching closed parenthesis. Similarly, a variable may be identified by determining whether there are characters before and after the operand of an equal sign. In this manner, the system can identify code for function calls or methods as well as variables for use as action code. In some examples, the self-creating AI system 102 may utilize regex checking to perform such searches and may validate such checking using white space checking. In various programming languages, white space checking may be omitted or may be otherwise adapted to conform with specific requirements of the other programming languages.

Action evaluation 116 may receive the cloned scripts including the action code. Action evaluation 116 may execute each of the cloned scripts to determine which of the actions are most effective in achieving the sub-objective. In various examples, action evaluation 116 may use reinforcement learning techniques to determine which of the actions is most effective in achieving the sub-objective. For example, a reinforcement learning algorithm may provide rewards (e.g., higher weights) for achieving the sub-objective, where more efficient solutions are given higher rewards. Accordingly, the action associated with the cloned script receiving the highest reward from the reinforcement learning algorithm when executed may be identified as the preferred action for achieving the sub-objective. In various examples, action evaluation 116 may further delete or otherwise destroy the cloned scripts after identifying the preferred action.

At block 510, the self-creating AI system 102 adds the preferred action to the self-creating script. For example, script configuration 114 may add the action code associated with the preferred action to the code template of the self-creating script. In some examples, the action code may be added to other action code previously added to the code template at different, earlier states.

At decision 512, if all states are not completed (e.g., the final objective is not yet accomplished), the method returns to block 506 for the next state. For example, code configuration 114 may determine, at decision 512, if the current state of the AI model matches an ending state of the overall objective. For example, with reference to FIG. 3, code configuration 114 may determine that a current state of the AI model is at state (3,3), while the goal state is state (5,5). Accordingly, because the current state does not match the goal state, code configuration 114 may determine that all states are not completed. Accordingly, the method 500 may return to block 506 to determine the preferred action for moving between the current state and the next state of the AI model.

If, at decision 512, all states are completed, the self-creating AI system 102 generates the AI model from the self-creating script including the preferred actions at block 514. In various examples, the method 500 may be completed during run-time of the AI model generated by the self-creating AI system 102. That is, the AI model may progress towards the overall objective while determining the most efficient actions to progress towards the overall objective. Accordingly, when the method 500 is complete and the AI model is in a state corresponding to a goal state, the initial (e.g., overall) objective is accomplished or completed. For example, with reference to FIG. 3, the method causes the AI model to determine the most efficient path between starting state (1,1) and goal state (5,5). When all states are completed and all actions are determined for moving between starting state (1,1) and goal state (5,5), the overall objective of finding a path between starting state (1,1) and ending state (5,5) is achieved.

In some examples, the completed script for the AI model generated by the method 500 may be conveyed to a user, exported from the self-creating AI system 102, and/or stored as script data 104 for later use by the self-creating AI system 102. For example, AI models generated using the self-creating AI system 102 may be exported for use within other software applications. The completed script may also be stored as script data 104 so that the action code generated and/or selected to generate the completed script may be used by the self-creating AI system to generate further AI models.

Figure 6:
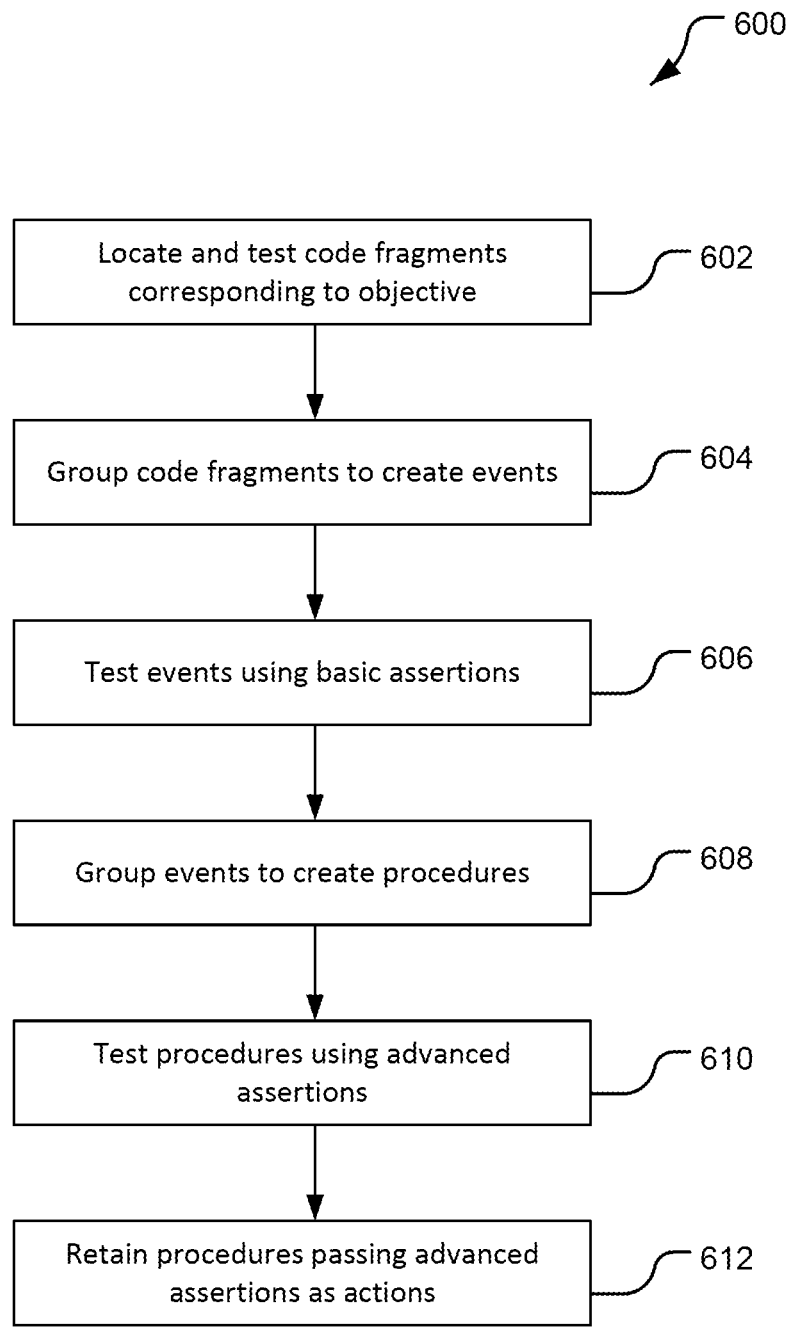
FIG. 6 illustrates an example method of creating action code from code fragments, in accordance with embodiments described herein.

FIG. 6 illustrates an example method 600 of creating action code from code fragments. The method 600 may, for example, be executed as part of block 406 of the method 400 or as part of block 506 of the method 500. The self-creating AI system 102 may execute the method 500 in implementations where the self-creating AI system 102 generates new action code using a programming language specification, such as the python grammar. At block 602, the self-creating AI system 102 locates and tests code fragments corresponding to an objective. Code fragments may be, for example, small pieces of code obtained from the python grammar, such as single lines of code or code fragments accomplishing a simple action, such as incrementing a value, assigning a variable, and the like.

Script configuration 114 may test the code fragments to ensure that the code fragments work properly, that is, that the code fragments both compile and execute without compilation errors or run time errors. Such testing ensures that the self-creating AI system 102 generates action code that follows syntax code of the relevant language and is functional. Testing may, in some examples, verify that the tested code fragments do not generate compile time or run time warnings. In some examples, such testing may use reinforcement learning techniques to identify fragments which may be later combined to ultimately generate action code. For example, the highest reward in the reinforcement learning algorithm may be associated with code fragments that compile and execute without any types of errors or warnings. In some examples, such code fragments may, in addition to being used in the remainder of the method 600, be stored as script data 104 for later use by the self-creating AI system 102.

The self-creating AI system 102 groups code fragments to create events at block 504. In various examples, script configuration 114 may group code fragments based on results of a reinforcement learning algorithm executed at block 602. For example, fragments receiving the highest rewards may be combined to create events. In some example, script configuration 114 may group code fragments by functionality. That is, script configuration 114 may group code fragments more likely to generate code which accomplishes some discrete task. Code fragments may, in various examples, be code fragments generated at block 602 of the method 600 and/or code fragments previously tested and utilized by the self-creating AI system 102, such as fragments stored as script data 104.

At block 606, the self-creating AI system 102 tests the created events using basic assertions. In various examples, script configuration 114 may test the created events by retrieving basic assertions (e.g., from script data 104) and adding such basic assertions to the code of the events. The code may then be executed with the basic assertions, and output of the code may indicate whether the events have passed the assertions. Basic assertions may, in various examples, be obtained from script data 104. In some examples, the events may be tested using multiple basic assertions. Basic assertions may verify that the created events are able to perform basic tasks, such as returning a certain number, assigning value to a variable, allocating memory to a variable, create a new file, and the like. Accordingly, events that pass the basic assertions perform some logical function or task which may be used to create functional actions for use in AI models generated by the self-creating AI system 102.

In some examples, the created events may be tested using reinforcement learning techniques. For example, events which pass all of the selected basic assertions may be most highly rewarded by a reinforcement learning algorithm, while events which pass none of the selected basic assertions are not rewarded or receive the lowest rewards from the reinforcement learning algorithm. For example, a reward function may result in a higher numerical value for each assertion passed, with more emphasis on important assertions (e.g., those which the code must pass to be functional). For example, where an event is tested using x and y assertions, where x assertion is more important than y assertion, an example reward function may be reward=3.0*x+y. In some examples, events may, in addition to being used in the remainder of the method 600, be stored as script data 104 for later use by the self-creating AI system 102.

The self-creating AI system 102 groups events to create procedures at block 608. In various examples, the highest rewarded events (as determined by a reinforcement learning algorithm) may be grouped together to create procedures. Accordingly, the events used to create the procedures have passed some basic assertions. In some examples, only procedures which have rewards above some threshold level may be used to create procedures.

At block 610, the self-creating AI system 102 tests procedures using advanced assertions. Script configuration 114 may test procedures by retrieving advanced assertions (e.g., from script data 104) and inserting the advanced assertions into code of the procedures. The procedure code may then be executed and the output evaluated to determine whether the procedures have passed the advanced assertions. Advanced assertions may include in various examples, series of assertions and/or assertions verifying that the procedures are able to perform some logical task or function. For example, advanced assertions may include tasks such as adding multiple numbers, returning a solution, appending a file, reading files, iterating through files, and the like. In various examples, procedures may be tested using reinforcement learning techniques, where procedures passing advanced assertions are most highly rewarded.

The self-creating AI system 102 retains procedures passing the advanced assertions as actions at block 612. For example, the highly rewarded procedures may be stored as action code at script data 104 and/or may be used within the method 400 of FIG. 4 or the method 500 of FIG. 5. For example, the retained procedures may be tested as action code at block 508 of the method 500. Accordingly, using the python grammar, actions which have not been previously used or coded may be utilized by AI models to solve various problems, expanding the possible solutions and allowing for the AI models to find more efficient solutions when compared to manually coded and/or traditionally trained AI models.

Using the methods and techniques described above, AI models may be trained more efficiently to solve problems and achieve objectives in a more efficient manner when compared to conventionally trained AI models. For example, the system described herein may utilize code from previously trained AI models solving similar problems, such that new AI models may build upon such code to be trained more efficiently. Further, using programming language specifications, the system is able to generate new code, which may lead to more efficient solutions which have not been previously contemplated or coded manually. Such new code may be generated as the new AI model learns how to solve a problem, making the training significantly more efficient that manually coded or conventionally trained models. For example, the AI model may be trained at run time.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A computer implemented method for generating an artificial intelligence (AI) model from a self-creating script coded in a programming language, the method comprising:
   receiving an overall objective for the AI model;
   generating a sub-objective for a first state of the AI model, wherein the sub-objective is generated based on the overall objective;
   generating a plurality of action code scripts based on a specification of the programming language by:
      identifying a plurality of code fragments, wherein the plurality of code fragments are identified from a plurality of candidate code fragments, wherein the plurality of code fragments are code fragments of the plurality of code fragments which compile and execute without warnings or errors,
      generating events by combining two or more of the plurality of code fragments, and
      generating a plurality of procedures by combining two or more of the events, wherein the plurality of scripts are identified from the plurality of procedures using a reinforcement learning algorithm to identify procedures passing advanced assertions;
   assigning rewards to each of the plurality of action code scripts using a reinforcement learning algorithm, wherein a higher reward is associated with achieving the sub-objective;
   identifying a preferred action code of the plurality of action codes based on the assigned rewards;
   inserting the preferred action code into the self-creating script; and
   executing the self-creating script including the preferred action code to satisfy the sub-objective.

2. A computer implemented method for generating an artificial intelligence (AI) model from a self-creating script coded in a programming language, the method comprising:
   receiving an objective for the AI model;
   obtaining at least first action code corresponding to a first action, the first action associated with an action objective similar to the objective;
   generating at least second action code based on one of the first action code and a specification of the programming language;
   executing the first action code to generate a first execution output of the first action code;
   executing the second action code to generate a second execution output of the second action code:
   comparing the first execution output of the first action code and the second execution output of the second action code based on a reward function:
   inserting one of the first action code and the second action code into the self-creating script based on the comparing the first execution output of the first action code and the second execution output of the second action code; and
   executing the self-creating script including the one of the first action code and the second action code to satisfy the objective.

3. The computer implemented method of claim 2, wherein the objective is associated with a state of the AI model, wherein the method further comprises:
   determining whether satisfying the objective also satisfies an overall objective of the AI model; and responsive to a determination that satisfying the objective does not also satisfy the overall objective, determining an additional objective for the AI model.

4. The computer implemented method of claim 3, wherein the self-creating script further includes at least a third action code selected to satisfy the additional objective for a second state, wherein the objective and the additional objective, when both satisfied, satisfy the overall objective of the AI model.

5. The computer implemented method of claim 2, wherein the specification of the programming language is a python grammar specification.

6. The computer implemented method of claim 2, wherein generating the at least second action code based on one of the first action code and a specification of the programming language comprises:
generating the at least second action code from a plurality of code fragments identified from the specification of the programming language, wherein the plurality of code fragments are tested to generate executable action code, and wherein the first action code and at least second action code are discretely executable.

7. The computer implemented method of claim 2, wherein generating the at least second action code based on one of the first action code and a specification of the programming language comprises:
combining the first action code with at least a third action code associated with a second action objective similar to the objective, wherein the first action code and at least second action code are discretely executable.

8. The computer implemented method of claim 2, wherein comparing the first execution output of the first action code and the second execution output of the second action code comprises:
inserting the first action code into a first clone of the self-creating script and inserting the second action code into a second clone of the self-creating script;
using a reinforcement learning to assign a first reward to the first clone of the self-creating script and a second reward to the second clone of the self-creating script, wherein a higher reward is associated with a desired execution output; and
comparing the first reward to the second reward.

9. The computer implemented method of claim 2, wherein the first execution output and the second execution output comprise the performance of a functional action for use by the AI model to satisfy the objective.

10. The computer implemented method of claim 2, wherein executing the first action code to generate a first execution output of the first action code comprises compiling the first action code into a first executable file and executing, via a processor, the first executable file to generate the first execution output, and wherein executing the second action code to generate a second execution output of the second action code comprises compiling the second action code into a second executable file and executing, via the processor, the second executable file to generate the second execution output.

11. The computer implemented method of claim 2, wherein generating the at least second action code based on one of the first action code and the specification of the programming language comprises:
generating a code template based on the first action code; and
generating the second action code by modifying a value of a variable of the code template.

12. The computer implemented method of claim 2, further comprising:
generating a database during the execution of the self-creating script including the one of the first action code and the second action code to satisfy the objective;
storing the one of the first action code and second action code in the database; and
generating a third action code based on the database.

13. The computer implemented method of claim 2, wherein the first action code and second action code comprise code of the same programming language as the self-creating script.

14. The computer implemented method of claim 2, wherein generating the at least second action code based on one of the first action code and a specification of the programming language further comprises generating the at least second action code based on code from a remote source.

15. A computer implemented method for generating an artificial intelligence (AI) model from a self-creating script coded in a programming language, the method comprising:
receiving an overall objective for the AI model;
generating a sub-objective for a first state of the AI model, wherein the sub-objective is generated based on the overall objective;
generating a plurality of action code scripts based on a specification of the programming language;
assigning rewards to each of the plurality of action code scripts using a reinforcement learning algorithm, wherein a higher reward is associated with achieving the sub-objective;
identifying a preferred action code of the plurality of action codes based on the assigned rewards, comprising executing each of the plurality of action code scripts and evaluating an output of the execution based on the assigned rewards;
inserting the preferred action code into the self-creating script; and
executing the self-creating script including the preferred action code to satisfy the sub-objective.

16. The computer implemented method of claim 15, further comprising:
identifying, based on a determination that the overall objective is not satisfied when the sub-objective is satisfied, at least an additional sub-objective for the AI model.

17. The computer implemented method of claim 15, wherein generating a plurality of action code scripts from a specification of the programming language comprises:
identifying a plurality of code fragments;
generating events by combining two or more of the plurality of code fragments; and
generating a plurality of procedures by combining two or more of the events, wherein the plurality of scripts are identified from the plurality of procedures using a reinforcement learning algorithm to identify procedures passing advanced assertions.

18. The method of claim 17, wherein the code fragments are identified from the specification of the programming language and a data source storing preexisting code fragments, wherein the preexisting code fragments are verified as executable script.

19. The computer implemented method of claim 15, further comprising:
storing the plurality of action code scripts generated from the specification of the programming language in a database for use in generating additional AI models.

20. A computer implemented method for generating an artificial intelligence (AI) model solving a problem, the method comprising:
- obtaining sub-objectives corresponding to a plurality of states of the problem;
- generating a plurality of portions of action code corresponding to a plurality of actions, wherein the portions of action code advance the AI model from a first state of the plurality of states to a second state of the plurality of states;
- testing each of the plurality of portions of action code, comprising executing each of the plurality of portions of action code;
- identifying, for the first state, a portion of action code of the plurality of portions of action code providing a most efficient transition from the first state of the plurality of states to the second state of the plurality of states;
- identifying, for a remainder of the plurality of states, respective additional portions of action code providing a most efficient transition from a respective state of the plurality of states; and
- combining the identified portions of action code for the first state and the remainder of the plurality of states to generate code providing a solution to the problem.

21. The computer implemented method of claim 20, wherein generating the plurality of portions of action code corresponding to the plurality of actions comprises:
- obtaining a plurality of code fragments from a programming language specification; and
- combining at least a portion of the plurality of code fragments into a portion of action code of the plurality of portions of action code.

22. The computer implemented method of claim 21, further comprising:
- testing a functionality of each of the plurality of code fragments; and
- wherein the at least a portion of the plurality of code fragments includes functional code fragments as determined by the testing.

23. The computer implemented method of claim 22, wherein identifying the portion of action code providing the most efficient transition from the first state comprises:
- using reinforcement learning techniques to assign a respective reward to each respective execution output; and
- identifying the portion of action code providing the most efficient transition based on the respective rewards assigned to each respective execution output.

24. The computer implemented method of claim 21, further comprising:
- combining the at least a portion of the plurality of code fragments into a plurality of code blocks; and
- identifying the plurality of portions of action code from the plurality of code blocks using assertions to test a functionality of the plurality of code blocks.

25. The computer implemented method of claim 20, wherein testing the plurality of portions of action code comprises:
- cloning a code template to create a plurality of code templates;
- writing a respective portion of the plurality of portions of action code into a respective code template of the plurality of code templates; and
- executing each of the plurality of code templates including the respective portions of action code to generate respective execution outputs for each of the plurality of code templates.

26. The computer implemented method of claim 20, further comprising:
- identifying the sub-objectives based on an overall objective of the problem.

* * * * *